(12) United States Patent
Lu et al.

(10) Patent No.: US 11,950,125 B2
(45) Date of Patent: Apr. 2, 2024

(54) CONSISTENT QUALITY OF SERVICE POLICY IN A SOFTWARE DEFINED ENTERPRISE

(71) Applicant: Hewlett Packard Enterprise Development LP, Houston, TX (US)

(72) Inventors: Hao Lu, Fremont, CA (US); Sachin Ganu, San Jose, CA (US); Xiaoding Shang, Beijing (CN); Nitin Changlani, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/559,518

(22) Filed: Dec. 22, 2021

(65) Prior Publication Data

US 2022/0116815 A1    Apr. 14, 2022

Related U.S. Application Data

(63) Continuation of application No. 17/024,610, filed on Sep. 17, 2020, now Pat. No. 11,246,055.

(51) Int. Cl.
*H04W 88/08*    (2009.01)
*H04L 45/64*    (2022.01)
(Continued)

(52) U.S. Cl.
CPC ......... *H04W 28/0268* (2013.01); *H04L 45/64* (2013.01); *H04W 24/02* (2013.01); *H04W 28/24* (2013.01); *H04W 88/08* (2013.01)

(58) Field of Classification Search
CPC ...... H04L 45/64; H04W 24/02; H04W 28/24; H04W 28/08
See application file for complete search history.

(56) References Cited

U.S. PATENT DOCUMENTS 7,697,422 B1    4/2010    Arad et al.
7,797,406 B2    9/2010    Patel et al.
(Continued)

FOREIGN PATENT DOCUMENTS

CN    101518020 A    8/2009
CN    101828361 A    9/2010
(Continued)

OTHER PUBLICATIONS

Barton, QoS Design and Deployment for Wireless LANs, Conference Presentation, Jun. 10-14, 2018, Cisco, Orlando, FL, 79 Pgs.
(Continued)

*Primary Examiner* — Syed Ali
(74) *Attorney, Agent, or Firm* — Hewlett Packard Enterprise Patent Department

(57) ABSTRACT

Systems and methods for providing enhanced Quality of Service (QoS) network transmissions can be based on an application sub-class or a user class. Systems and methods can include inspecting the information packet having a network level QoS field having a first network level QoS portion and a second network level QoS portion, determining an application sub-class or user class associated with the information packet, tagging the first network level QoS portion of the information packet according to a first network level QoS value, tagging the second network level QoS portion of the information packet according to a traffic priority indication and to a determined application sub-class or user class, and queuing the information packet for transmission from a network element based on the tagged first network level QoS portion and the second network level QoS portion.

10 Claims, 5 Drawing Sheets

(51) Int. Cl.
*H04W 24/02* (2009.01)
*H04W 28/02* (2009.01)
*H04W 28/24* (2009.01)

(56) References Cited

U.S. PATENT DOCUMENTS

| | | | | |
|---|---|---|---|---|
| 9,148,817 | B1* | 9/2015 | Nguyen | H04L 47/2466 |
| 10,027,626 | B2* | 7/2018 | Short | H04L 67/02 |
| 10,492,096 | B2* | 11/2019 | Lee | H04W 28/0263 |
| 2001/0024434 | A1 | 9/2001 | Ayyagari et al. | |
| 2002/0159418 | A1 | 10/2002 | Rudnick et al. | |
| 2003/0203736 | A1 | 10/2003 | Chi et al. | |
| 2007/0195742 | A1 | 8/2007 | Erdman et al. | |
| 2010/0142447 | A1 | 6/2010 | Schlicht et al. | |
| 2012/0155298 | A1 | 6/2012 | Yang et al. | |
| 2012/0230200 | A1* | 9/2012 | Wentink | H04L 1/1896 370/241 |
| 2014/0181319 | A1* | 6/2014 | Chen | G06F 13/385 709/234 |
| 2014/0241247 | A1* | 8/2014 | Kempf | H04W 76/12 370/328 |
| 2018/0198716 | A1* | 7/2018 | Karthikeyan | H04L 47/805 |
| 2018/0324633 | A1* | 11/2018 | Lee | H04W 8/04 |
| 2019/0155645 | A1* | 5/2019 | Browne | G06F 9/4881 |
| 2020/0045576 | A1 | 2/2020 | Huang et al. | |
| 2021/0409335 | A1* | 12/2021 | Zhu | H04L 47/24 |

FOREIGN PATENT DOCUMENTS

| | | |
|---|---|---|
| CN | 105099947 A | 11/2015 |
| CN | 105684546 A | 6/2016 |
| CN | 107534916 A | 1/2018 |

OTHER PUBLICATIONS

Cisco Systems, "Diffserv—The Scalable End-to-End Quality of Service Model", Whitepaper, Aug. 2005, 19 Pgs.

Fairhurst, Update to IANA Registration Procedures tor Pool 3 Values in the Differentiated Services Field Codepoints (DSCP) (RFC 8436), Protocol, Aug. 2018, Registry Internet Engineering Task Force 8 Pgs.

Nichols, et al, "Definition of the Differentiated Services Field (DS Field) in the IPv4 and IPv6 Headers" (RFC 2474), Protocol, Dec. 1998, 21 Pgs.

Postel, et al, "Internet Protocol Darpa Internet Program Protocol Specification (RFC 791)", Protocol, Sep. 1981, Information Sciences Institute, Marina del Rey, CA, 97 Pgs.

Quality of Service (Qos) Configuration Guide, Cisco IOS XE Everest 16.x (Catalyst 9400 Switches), Configuration Guide, Nov. 3, 2017, Cisco, 124 Pgs.

* cited by examiner

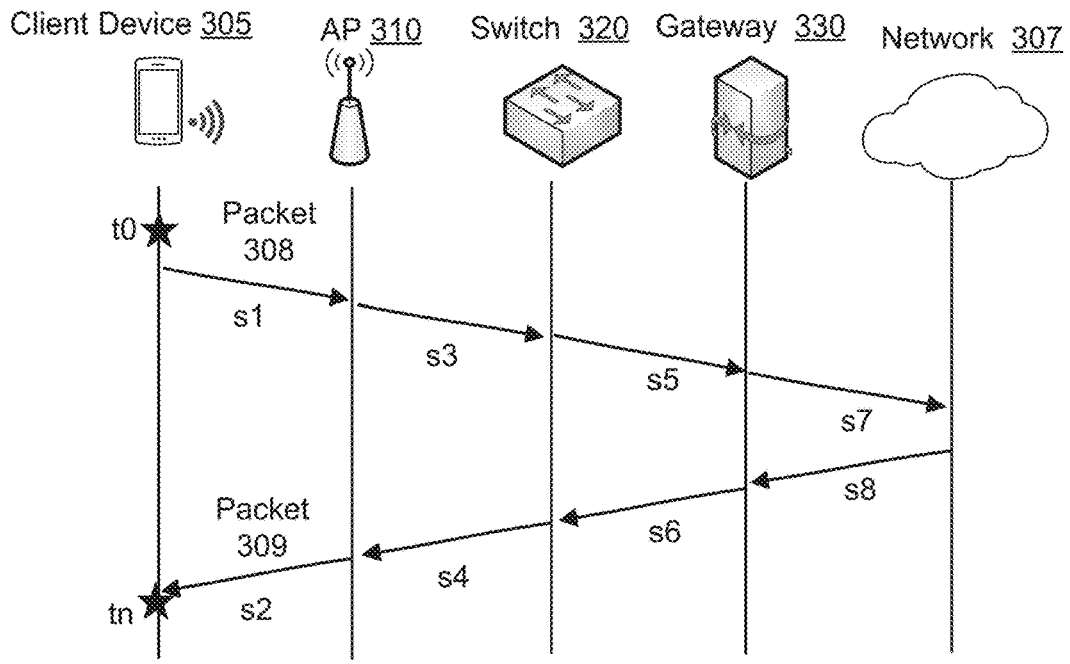

FIG. 3A

| Segment | From | To | Action at Related Network Element |
|---|---|---|---|
| s1 | Client Device | Access Point | Tag first network level QoS portion based on WMM and/or UP mapping. Tag second network level QoS based on enterprise level traffic priority. Route packet |
| s2 | Access Point | Client Device | Map first network level QoS portion to application layer WMM according to WMM and/or UP mapping. Map second network level QoS portion to a particular queue for transmission. Route packet |
| s3 | Access Point | Switch | Route packet |
| s4 | Switch | Access Point | Route packet |
| s5 | Switch | Gateway | Route packet |
| s6 | Gateway | Switch | Route Packet |
| s7 | Gateway | External Network | Route packet |
| s8 | External Network | Gateway | Tag second network level QoS portion based on enterprise level traffic priority. Tag first network level QoS portion based on WMM and/or UP mapping. Route Packet |

FIG. 3B

CONSISTENT QUALITY OF SERVICE POLICY IN A SOFTWARE DEFINED ENTERPRISE

CROSS REFERENCE TO RELATED APPLICATIONS

This application is a continuation of, and claims the priority benefit of U.S. patent application Ser. No. 17/024,610, filed on Sep. 17, 2020 the contents of which are incorporated herein by reference in their entirety.

DESCRIPTION OF RELATED ART

In the field of computer networking and other packet-switched telecommunication networks, quality of service (QoS) traffic prioritization and resource reservation control mechanisms allow for packet transmission according to certain priority.

BRIEF DESCRIPTION OF THE DRAWINGS

The present disclosure, in accordance with one or more various embodiments is described in detail with reference to the following figures. The figures are provided for purposes of illustration only and merely depict typical or example embodiments.

FIG. 3A shows example networking timing and/or routing diagram according to aspects of the present disclosure.

FIG. 3B shows a summary in a table format of example actions that can be taken at network elements across routing segments of the network routing diagram shown in FIG. 3A.

The figures are not exhaustive and do not limit the present disclosure to the precise form disclosed.

DETAILED DESCRIPTION

Some protocols allow for end-to-end QoS at the wireless and wired transmission segments of a network. The IEEE 802.11 (e.g. IEEE 802.11e) standard is a standardized protocol for wireless transmission segments) (e.g. wireless local area network (WLAN)), and defines the mapping between Wi-Fi user priority (UP) (and/or traffic identifier (TID)) to/from an Internet Protocol (IP) Differentiated Services Codepoint (DSCP). The mapping can transfer WLAN media access control (MAC) QoS into an IP network, and map IP network to the MAC QoS. However, per IEEE 802.11e, client applications having the same UP/TID will be mapped into the same DSCP value or codepoint. Hence there is no difference in how priority will be treated between packets having the same UP (and/or TID) at the wired and/or wireless transmission segments.

Further, some protocols allow for enhanced radio resource assurance. IEEE 802.11ax (marketed as Wi-Fi 6) enables WLAN infrastructure to have tighter control over the scheduling of transmissions, increases throughput, and improves spectrum efficient utilization. For example, IEEE 802.11ax offers Orthogonal Frequency Division Multiple Access, Multi User Multiple-Input Multiple-Output (MU-MIMO), and target wake time (TWT). These benefits of wireless transmission segment Quality of Service (QoS) enhancements cannot be fully realized if there is a resource bottleneck at the wired transmission segment. This is especially important for enterprise critical, delay sensitive applications, such as specific voice and/or video applications.

Thus what is needed is an end-to-end QoS enhancement across all network segments, and for wireless and/or wired devices. An end-to-end QoS is also needed in a software-defined (SD) enterprise network. The present disclosure also provides for end-to-end QoS with continuity at the interfaces, and improved routing of information according to enhanced priority levels and/or QoS dimensions. The present disclosure also provides systems with backwards compatibility.

Figure 1:
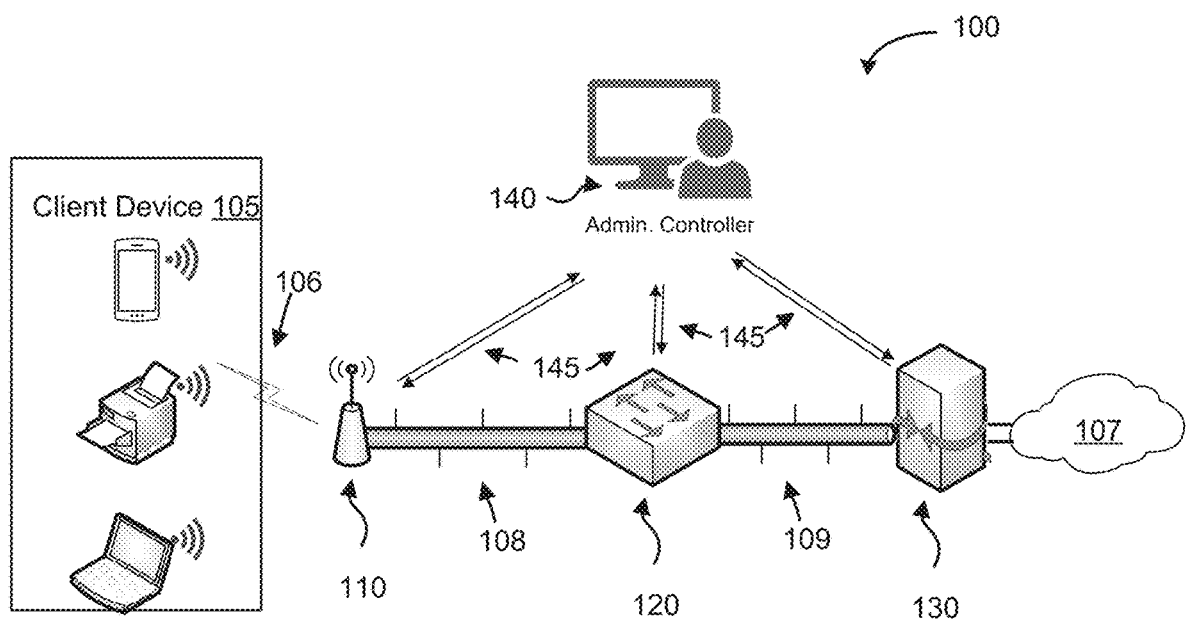
FIG. 1 depicts a block diagram of a network configuration that can be implemented for an enterprise according to embodiments of the technology disclosed herein.

FIG. 1 depicts a block diagram of a network configuration 100. Network configuration 100 can be implemented for an organization, such as a business, educational institution, governmental entity, healthcare facility, and/or other organization. The network configuration 100 can be implemented for multiple users. The network configuration 100 can be implemented across a local or wide area, including across multiple geographic sites. The network configuration can be coupled to one or more client device(s) 105. The network configuration 100 can couple client device 105 at least by a wireless transmission segment 106 (e.g. WLAN). Client device 105 can be provisioned access to the network. Network configuration 100 can allow for coupling of one or more client devices 105 to one or more network coupled devices and/or resources, such as a server, another client device, and/or another configuration 100 or internet coupled device or resource. For example, the network configuration 100 can couple client device 105 to external network 107, such as the Internet. The network configuration 100 can couple client device 105 to external network 107 (e.g. internet) coupled devices (not shown).

Examples of client device(s) 105 may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Client device 105 can have one or more application(s) operating on the client device. Application can be for example, a network browser, an email application, a voice-over-IP application, a multimedia application etc. Network configuration 100 can allow for transmission of one or more data, and/or traffic, i.e. information packets (IP packets, or packets as used herein) across at least a portion of the network configuration. IP packets can facilitate the one or more application(s) operating on the client device 105. Although not limited to this example, client device(s) 105 can request and access multimedia content. For example, the application can be a multimedia (e.g. video graphical, audio, and/or text) application, and the network can allow for the client device to access a server (e.g. internet coupled server)

coupled to the network 107 which can include streamable and/or downloadable multimedia content.

Network configuration 100 can be a software defined (SD) network. Network configuration 100 can include one or more wide area network (WAN), local area network (LAN), virtual LAN (ULAN) or WAN, virtual extensible LAN (VXLAN) or WAN. Network configuration 100 can be described with one or more overlay and/or underlay. In general, network configured 100 can have one or more wireless transmission segment 106 and/or one or more wired segments. For example, FIG. 1 shows wireless transmission segment 107, wired segment 108 and wired segment 109. In systems, configuration 100 can be a protocol enabled network. For example, configuration 100 can be protocol enabled in that the configuration 100 can allow for transmission across at least one wireless and/or wired segment of the network configuration 100 according to a protocol. For example, a protocol can be according to a standard of interoperability, such as the IEEE 802.11 protocol. For example, configuration 100 can be enabled to support IEEE 802.11ac and/or IEEE 802.11ax at the wireless transmission segment.

Network configuration 100 can include one or more network elements. Network elements can provide network connectivity to the one or more client devices 105. Network elements can be embodied as a router, in that they can forward data packets between networks. For example, client devices can access one or more network coupled devices and/or external coupled devices by communicating at least with the network element(s). Network elements can be embodied as one or more access point (AP) 110, network switch 120, router, server, and/or network gateway 130. Network 100 may be a public and/or private network. The network (e.g. the underlay) may include third-party telecommunications lines, such as phone lines, broadcast coaxial cable, fiber optic cables, satellite communications, cellular communication, etc. One or more network elements can be coupled to each other by such third party telecommunications lines. The network configuration may include intermediate network elements, such as switches, routers, gateways, servers, and/or controllers, which facilitate communication between the various parts of the network configuration. As used herein, a network element closest to the client device 105 (not necessarily geographic proximity, but rather least numbers of hops and/or network segments) can be an ingress to the network configuration 100 for traffic sent from the client device (e.g. with a destination to a device otherwise coupled to external network 107), and/or an egress to the network configuration 100 for traffic sent to the client device 105 (e.g. from external network 107). As used herein, a network element closest to the external network 107 (not necessarily geographic proximity, but rather least numbers of hops and/or network segments) can be an ingress to the network configuration 100 for traffic sent from the external network 107, and/or an egress of the network configuration 100 for traffic sent to the external network 107 (e.g. from client device). For example, AP 110 and/or gateway 130 can be ingress and/or egress network elements. Further network elements can include or be included in one or more nodes of a software-defined networking (SDN) network, which will be elaborated on more closely below.

The administrative controller 140 can be configured to assign at least one QoS priority. The QoS policy enforcement process can be orchestrated from an external service, for example a "Policy Orchestration Service" (POS) hosted in the cloud. The administrative controller 140 can direct each network element by providing instructions for the right actions to be triggered at the network elements) to enforce the QoS policy. The network elements can be configured by the administrative controller 140 to accommodate a service level agreement, customer policies, and/or priorities. In systems, a priority can be assigned based on at least one of an application operating on the client device and/or a user of the client device. The controller 140 can provide direction to network elements for the network elements to queue for transmission one or more packets and/or traffic according to a specific and/or requested priority level and/or QoS service dimension. For example, QoS service dimensions can include transmission bitrate, latency, jitter probability, traffic loss probability, throughput, reliability, drop probability, and/or any other service dimension (e.g. as required by a policy). In systems, the controller 140 can control a per hop behavior (PHB) at or between one or more network elements. PHB can refer to the packet scheduling, queueing, policing, or shaping behavior of a node and/or network element on any given packet. The packets can be queued for transmission according to an enterprise-wide policy. The policy can be focused on ensuring different traffic classes are routed within the network such that QoS, Policy Orchestration Service (POS) and/or service level agreement (SLA) requirements are met. The policy can be enforced by specific PHB.

Network configuration 100 can be embodied as a SD-WAN. A SD-WAN may simplify the management and operation of a WAN by decoupling (separating) the networking hardware (e.g. physical elements of network elements) from its control mechanism. A SD-WAN may be used to automatically balance workloads across multiple connections, maximize cost-efficiencies while optimizing applications and traffic across multiple network segments. A SDN overlay can be a deployment method for network virtualization and SDN that involves running a logically separate network or network component on top of an existing infrastructure (e.g., an underlay physical network). A SD-WAN overlay can be a type of SDN overlay.

In an overlay network, an enterprise may prefer to control packet routing (for example, to suit network topology, to accommodate priorities, to achieve load balancing, etc.) instead of allowing a service provider (e.g., a third party service provider that controls underlying third party telecommunications lines) to manage the packet routing. In a SD-WAN, the administrative controller 140 as shown in FIG. 1 can be an SD-WAN controller (and/or SD-WAN orchestrator), which can be used to control the overlay of the SD-WAN and/or the WAN underlay. As used herein, administrative controller 140 can be a SD-WAN controller which controls at least one physical or virtual component of the network element(s), such as at least one network element of an SD-WAN underlay. As used herein, a SD-WAN controller can also control at least one element of an SDN capable node of an SD-WAN overlay. In some embodiments, the QoS policy enforcement and/or orchestration process can be different or the same between underlay and overlay.

AP 110 network elements can be implemented, for example as routers. AP 110 can be implemented as wireless access points, in that they allow for one or more client devices 105 to gain access to the network by a wireless (e.g. radio) connectivity.

One or more switch 120 can be intermediate network elements. Switch 120 can further direct the flow of traffic.

Gateway network element(s) 130 can be implemented, for example, as a software defined wide area network (SD-WAN) gateway. The gateway 130 can connect the network configuration 100 to a network, such as external network 107. The gateway 130 can connect the network configuration 100 to the internee, a LAN, a WAN, etc. Gateway 130 can connect to a singular network 107, or to multiple networks. If the gateway 130 possesses the functionality of an AP or switch, the various devices can couple directly to it without going through the other network elements (e.g. AP 110, switch 120).

The administrative controller 140 can be a cloud-based network management and monitoring solution for the network elements, such as access points, switches, gateways. The administrative controller 140 can be coupled to one or more networks, including external networks and the Internet. In the example shown in FIG. 1, network elements including AP 110, switch 120, and/or gateway 130 can be managed by the administrative controller 140. The network elements can communicate with the controller 140 over wired and/or wireless connections 145. The network elements can have monitoring elements which monitor and/or report one or more traffic parameter (e.g. maximum, minimum and/or average jitter, latency and packet loss) for each packet and/or information flow across a network segment, to the Controller 140. Traffic parameters can be related to one or more QoS dimensions for packet transmission and/or traffic.

The Consistent Enhanced QoS Policy

Network configuration 100 can be aware of one or more client device characteristics and can provide a resource assurance based on a client device characteristic(s). In some embodiments, the client device characteristic can be based on an application operating on the client device 105, including a sub-class of the application type. The network configuration 100 can thus have application awareness. In some embodiments, the client device characteristic can be based on a user using at least one function and/or application of the client device 105. The network configuration 100 can thus have user awareness. In embodiments, the network configuration 100 can provide a resource assurance according to a specific application on the client device, a user of the client device, a type, class, and/or sub-class of application, and/or a type of user. A resource assurance can include at least one of a bandwidth priority, a traffic parameter, and/or a QoS dimension as described herein. Example sub-classes of applications can be based on criticality of the application for the enterprise. Network configuration 100 can provide resource assurance(s) for business specific critical applications. For example, whereas there can be more than one video and/or voice applications operating on a client device 105, one or some specific video and/or voice applications can be designated as business critical applications. Embodiments described herein may be able to distinguish between applications deemed non-business critical, and those deemed business critical (e.g. possible application sub-classes), for example by deep-packet-inspection. For example, Skype for Business can be prioritized over FaceTime, whereas Zoom can be prioritized over both. In general systems described herein are able to provide different and/or enhanced transmission and/or resource priority according to not only a class of application, but a sub-class and/or user of the application (i.e. a finer level of granularity). Further, priority can be determined based on how the application is being used, e.g. what specific subroutine of the application the packet corresponds to, and/or to the type of data within a packet corresponding to the application. Embodiments described herein are able to use traffic priority to distinguish between routine enterprise applications and also critical enterprise applications (and packets thereof). Further, embodiments are able to provide different and/or enhanced priority and/or resource priority and/or assurance according to a user and/or type of user. For example, network configuration 100 can provide an enhanced resource priority and/or assurance for an enterprise critical user, as compared to a non-critical user.

Figure 2:
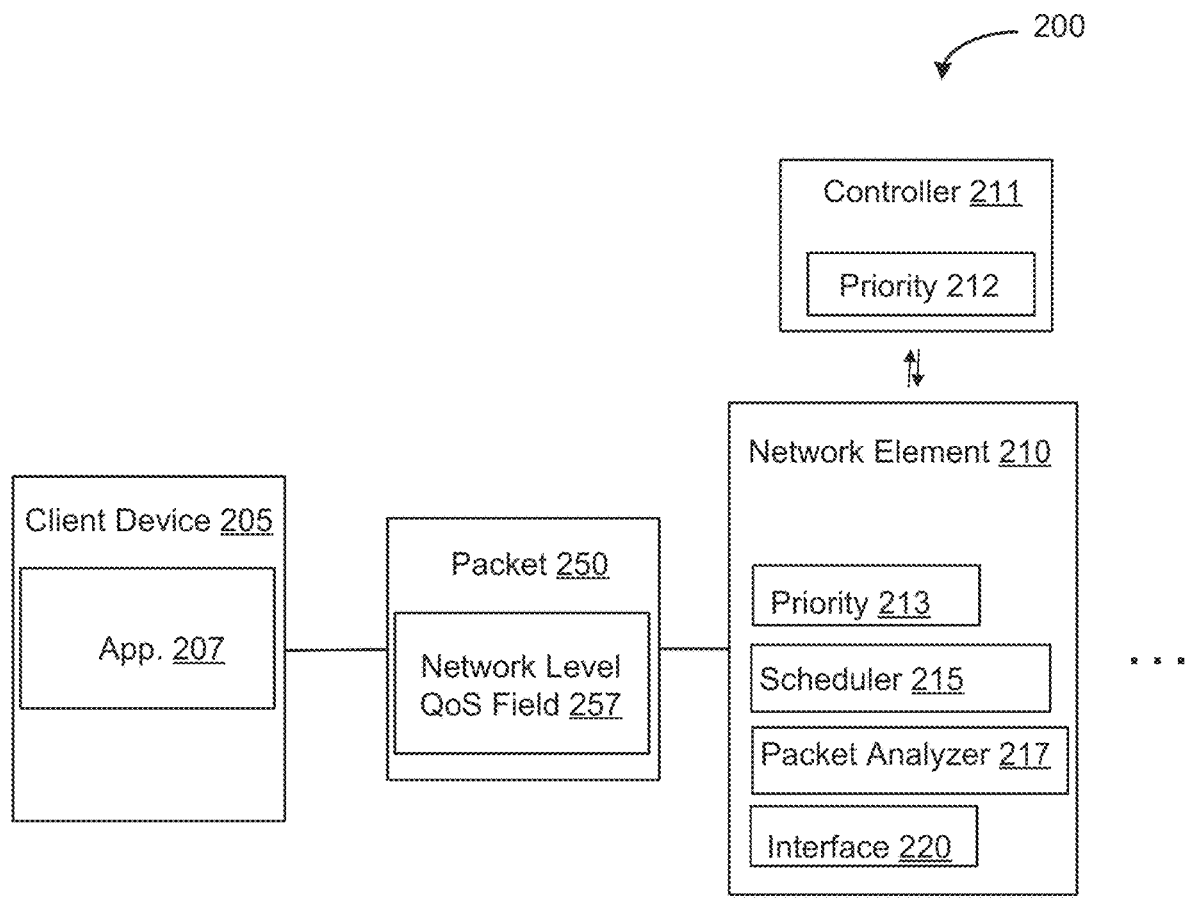
FIG. 2 depicts another block diagram of a network configuration including network elements and traffic.

FIG. 2 depicts another block diagram of a network configuration 200 including network elements and traffic. Configuration 200 can be a portion of a full network configuration, at least as indicated by ellipses. Client device 205 may execute an application 207 and may have an IP address. The application 207 may be for example a streaming video service, and/or Voice-over-IP service. Applications executed by the client device 205 are not limited to these examples but may include any application which employs communication over network. Packet 250 can correspond to data needed for application 207. For example, packet 250 can be data transmitted to or from another device, a server, network, etc. for the operation of application 207. Packet 250 can be modulated on a signal (e.g. RF, digital, etc.) between the network element 210, client device 205, and/or other network or device. Packet 250 can include one or more fields. One such field can be a network level QoS field 257. Network level QoS field 257 can comprise one or more bits of information, for example, five binary bits, six binary bits, eight binary bits, etc. Network level QoS field 257 can be a DSCP field and have a corresponding DSCP value. Network level QoS field 257 can have one or more portions. Each portion of the network level QoS field 257 can have a corresponding value.

FIG. 2 further shows an example network element 210 that can correspond to one or more network element as described herein (e.g. either of the network elements shown in FIG. 1, or other network elements), and an example controller 211 that can correspond to controller as described herein (e.g. controller 140 as shown in FIG. 1, a controller part of network elements, or another controller). If the network element 210 receives data, packets, and/or traffic from one or more client devices 205, and/or other networks, the network element can be an ingress network element 210. If the network element 210 transmits data, packets, and/or traffic to one or more client devices 205, and/or other networks, the network element can be an egress network element.

Network element(s) 210 can receive an indication of a traffic priority, e.g. from the controller 211. The indication can be stored in a data store, etc. of the network element 210. The indication can be, for example, required QoS service dimensions and corresponding levels that can correspond to SLA, a policy map, a priority for the enterprise, and/or a POS. The indication can be, for example, required QoS dimensions and/or corresponding levels for various client device characteristics, such as enterprise critical and/or non-critical classes, sub-classes, users, and/or user types, which can correspond to a specific SLA. For example, the indication can be part of traffic priority 212. Traffic priority 212 can include one or more mappings between values for network level QoS field 257, and particular queue(s) for transmission (e.g. according to specific QoS dimensions). Traffic priority 212 can include one or more mappings between values for network level QoS field 257, and particular one or more client device characteristic(s). Traffic priority 212 can be stored in a lookup table, and/or other data store of the network device(s) 210 and/or the controller 211. The look-up table can contain one or more QoS service dimensions (e.g. transmission bitrate, latency, jitter probability, traffic loss probability, throughput, reliability, drop probability, and/or any other QoS dimension according to a policy, such as an SLA), corresponding one or more client device characteristic (such as client device types, application class, sub-class, enterprise criticality, enhanced priority, user name, and/or user types, etc.), and/or corresponding one or more possible values for the network level QoS field 257, or portion thereof, Thus, embodiments described herein can map one or more values for the network level QoS field 257, and/or values of portions thereof to particular queue(s) for transmission from the corresponding network element(s) 210. Traffic priority 212 in the network element 210 can be a subset of traffic priority 212 stored in the controller 211. For example, the traffic priority 212 in the network element 210 can correspond to traffic priority relating to traffic routed to/from that network element 210. Traffic priority 212 can include the previously mentioned indication, and all required priority for the enterprise. The traffic priority 212 can be input into the lookup table and/or other data store, upon receipt by an enterprise level administrator (e.g. by a user interface), and/or upon configuration of SLA requirements. The traffic priority 212 can include a different and/or same priority depending on specific application classes, sub-classes, and/or users of the enterprise network. The traffic priority 212 can correspond to QoS dimensions and/or QoS levels for how network elements can queue for transmission and/or transmit one or more packets and/or traffic. The traffic priority 212 can include a hierarchy for the priority depending on the various client device characteristics. The traffic priority 212 can further include one or more priority depending on one or more possible values for the network level QoS field 257, or portion of field 257 thereof.

One or more data, traffic, packets, etc. can be queued and/or routed for transmission according to the traffic priority as indicated by at least one of a value, or one or more portion(s) of the network level QoS field 257, by a scheduler 215. For example, each network element 210 can allow for prioritized queuing and/or scheduling based on one or more portions of the network level QoS field 257. Transmission can be performed according to a specific and/or requested priority and/or QoS service dimension, including transmission bitrate, delay, latency, jitter probability, traffic loss probability, throughput, reliability, cost, drop probability, and/or any other policy as described herein, such as QoS policy. For example, a higher priority across one or more QoS dimensions can be required for enterprise critical applications and/or users, compared to non-critical applications and/or users. Scheduler 215 can be a scheduling circuit. The scheduler 215 can forward, queue and/or route traffic, data, packets, according to a specific per hop behavior, and/or according to the corresponding priority. One or more network interface(s) 220 can be configured to interface with one or more other network elements, client devices, and/or other networks. For example, one or more packets, data, and/or traffic as described herein can be received, routed, forwarded, and/or transmitted from network interface(s) 220. As previously described, network elements can further have monitoring elements which monitor and/or report one or more traffic parameter (e.g. maximum, minimum and/or average jitter, latency, bandwidth, packet loss, etc.), adherence to a 005 level, requested resource priority, for each packet and/or information flow across a network segment. Traffic parameters can be related to one or more service dimensions for packet transmission and/or traffic as described herein.

Embodiments of the present disclosure allow for flexibility to not necessarily queue data for a specific application with data for other applications having the same Wi-Fi Multimedia (WMM) category (e.g. background, voice, video, etc.) in the same transmission queue, and/or with the same QoS priority and/or PHB. For example, a higher priority for the enterprise video and/or voice application would normally be assigned with Wi-Fi Multimedia (WMM) Access Category (AC) "VI" or "VO". In contrast to embodiments of the present disclosure, in methods that predate those of the present disclosure, higher priority enterprise video and/or voice application would be treated the same as other video and/or voice traffic (e.g. those marked WMM AC "VI"/"VO"). Embodiments of the present disclosure allow for queuing traffic with a higher priority for the enterprise at an enhanced QoS priority over other traffic which is marked the same WMM AC and/or TID.

One or more embodiments of the present disclosure allows flexibility to not necessarily queue a specific data or traffic from/to an enterprise critical user over other users in the same transmission queue, and/or with the same QoS priority. Similarly to the application classification, network connected device users could be allocated the same priority under current systems. Embodiments of the present disclosure allow for network element 210 can queue the traffic for transmission, and/or further group the enterprise critical application and/or enterprise critical user into a higher priority (e.g. for the wired transmission segments, and/or for downstream segments) by employing one or more methods as described herein.

A standard mapping can map WLAN media access control (MAC) QoS into a standard (i.e. not enhanced) QoS IP network. One or more network element 210 as described herein can conduct this mapping. For example, traffic can be received from the client device (in the upstream direction from the wireless to wired) at an ingress network element (e.g. AP 110 as shown in FIG. 1). The ingress network element (and/or another network element) can map a wireless transmission segment access category to a portion of a network level QoS field. As previously mentioned network level QoS field 257 can be or include a DSCP field. For example, a first portion (e.g. the first three most significant bits) of the network level QoS field 257 can correspond to a standard mapping between WMM and an IP precedence. This can allow for network devices to remain backwards compatible with systems that look into IP precedence bits of DSCP field, and/or for network devices that are not "in-the-know" with either of the schemes employed herein to be employed as part of the network configuration. This can also improve the manner in which network traffic may be routed, for example by providing enhanced priority based routing as described herein.

WLAN software (e.g. operating at the AP 110 and/or the controller 140) can prioritize one enterprise critical application over others of the same WMM category (e.g. background, voice, video, etc.) and/or traffic identifier (TID), by looking into the network level QoS field. By WLAN MAC processing, the enterprise critical application can be grouped into a higher priority transmission queue, for example, for the wireless transmission segment. For example, at an egress over WLAN, by WLAN MAC processing a data packet and/or traffic corresponding to an enterprise critical application and/or user, can be sent to a client device according to a higher priority.

TABLE 1

Mapping Between wireless and wired segment QoS

| WMM Access Category | IEEE 802.11e UP | Decimal Value | DSCP Value | Per Hop Behavior |
|---|---|---|---|---|
| AC_BE(Best effort) | 0 | 0 | 000 000 | Best effort |
| | 3 | 24 | 011 000 | CS3 |
| AC_BK(Background) | 1 | 8 | 001 000 | CS1 |
| | 2 | 16 | 010 000 | CS2 |
| AC_VI(Video) | 4 | 32 | 100 000 | CS4 |
| | 5 | 40 | 101 000 | CS5 |
| AC_VO(Voice) | 6 | 48 | 110 000 | CS6 |
| | 7 | 56 | 111 000 | CS7 |

Table 1 shows at least a set of mapping rules according to an application-level protocol. In Table 1, the first column can correspond to a Wi-Fi Multimedia (WMM) Access Category. For example, the categories can correspond to background, best effort, video, and/or voice. Background, for example, can correspond to a bandwidth and/or other priority to be allocated for background traffic such as filed downloads or for print jobs. Best Effort can correspond to bandwidth for best effort traffic such as a traffic from legacy client devices or traffic from applications or devices that do not support QoS. As shown in Table 1, the second column can correspond to the IEEE 802.11e UP value. IEEE 802.11e UP value and/or IEEE 802.11e TID (not shown in Table 1, but can be the binary equivalent of the UP) can be included in an application layer message and/or according to an application layer protocol. For example, a voice access category as shown in column 1, can correspond to IEEE 802.11e UP value 6, or UP value 7. An IEEE 802.11e TID value can correspond to the binary value for the UP value. As further shown in Table 1, the IEEE 802.11e UP (or corresponding TID value, not shown, but can be the binary equivalent of the UP) can be mapped to a portion of the DSCP value shown in the fourth column. For example, the IEEE 802.11e UP value can be mapped to the first three most significant bits of the DSCP value. As further shown in Table 1, column 5 shows each DSCP value can correspond to a specific per hop behavior.

Network elements 210 can have one or more packet analyzers 217. Packet analyzers 217 can be a packet analyzing circuit, and can look into and/or inspect packet 250, and/or read, write, and/or tag the packet 250 (e.g. a field and/or header thereof). For example, network element 210 can inspect and/or look into network level QoS field 257. Network element 210 can perform, for example, deep-packet-inspection. Packet analyzer 217 can determine if the network level QoS field 257 has already been tagged (or not). Network element(s) 210 can tag network level QoS field 257 (e.g. a first portion, second portion thereof etc.). Network elements) 210 can tag network level QoS field (e.g. a first portion, second portion thereof etc.), only if the field (or portion thereof) has not been tagged. The network level QoS field 257 can be tagged according to the requisite traffic priority, and/or according to the client device characteristic. The network level QoS field 257 can be tagged by any (e.g. either, all, one or more, two or more, etc.) network elements. As previously explained, network elements can route network traffic according to a priority based on the network level QoS field 257. As previously noted, one or more network element 210 as described herein can map one or more portion of the network level QoS field 257 according to a standard mapping (e.g. between WMM and an IP precedence). As used herein, mapping can include inspecting, reading, writing, and/or tagging one or more bits of a packet by the packet analyzer 217.

A first portion of the network level QoS field 257 can be tagged according to a standard mapping (e.g. a standard application based mapping), and/or a first QoS service dimension. For example, the standard mapping can be based on a class of the application 207, as determined by an application layer protocol and/or as shown in an application layer message.

A second portion of the network level QoS field 257 can be tagged according to a second service dimension (which is the same or different than the first QoS dimension), and/or according to an enhanced priority. The second portion of the network level QoS field 257 can be tagged according to the enterprise criticality of the application 207, a sub-class of the application, and/or based on the user of the application 207.

In other examples, priority is based on multiple QoS service dimensions, including enhanced priority as discussed herein. It should be understood that any combination of values for the network level QoS field 257 can be used to signal a priority level across one or more QoS dimensions as described herein, and/or according to the client device characteristic as described herein. For example, if the network level QoS field 257 has six binary bits, 64 different combination of priorities can be used (i.e., the system would be able to accommodate SLAs according to 64 different combinations of QoS service types, including enhanced priority—e.g. according to class, sub-class, user, etc., and corresponding service levels).

As previously discussed, any values for network level QoS field 257, or portion thereof, can be used to signal priority. A first non-limiting example with pool 2 or pool 3 codepoints per RFC2474/RFC8436 allocation of DSCP values the first portion can correspond to first three most significant bits of the network level QoS field 257, and can be tagged according to a standard mapping. The second portion can correspond to the fourth bit of the network level QoS field 257, and can be tagged according to an enhanced priority, an application subclass, a user, an enterprise criticality, etc. For example, a 1 can signal a low enhanced priority, or 0 a high enhanced priority (or the reverse). Fifth and sixth bits can correspond to signal a set of codepoint values of a standard DSCP field. For example, fifth and sixth bits can correspond to 1 1 if Pool 2 codepoint, and/or 0 1 if Pool 3 codepoint per RFC2474/RFC8436.

As another non-limiting example, the first portion of the network level QoS field 257 can correspond to first three most significant bits of the network level QoS field 257, and can be tagged according to a standard mapping as described herein. The second portion can correspond to the fourth and/or fifth bit of the network level QoS field 257. For example, a 1 in either the fourth or fifth bit can signal a low enhanced priority, or a 0 can signal a high enhanced priority (or the reverse). The fourth and fifth bits can both also be used for the orchestration. For example, 0 0 for lowest enhanced priority, 0 1 for medium low enhanced priority, 1 0 for medium high enhanced priority, 1 1 for highest enhanced priority (or any other 2 bit combination). As a pool 1 codepoints example per RFC2474 J RFC8436 allocation of DSCP values, 0 can be used as a sixth bit to signal Pool 1 codepoints per RFC2474 RFC8436.

FIG. 3A shows an example networking timing and/or routing diagram for enhanced QoS across a network. One or more networking timing and/or routing can be used, e.g. depending on the network configuration 100. As a non-limiting example of timing and/or routing, diagram 300 shows traffic routed between client device 305, external network 307, and multiple in-between network elements, including AP 310, switch 320, and gateway 330. It is understood similar timing and/or routing can be employed for multiple network elements, client devices, etc., including those not shown in diagram 300. Although external network 307 is shown, it is understood traffic can be routed between one or more client devices, non-client devices, other devices, network elements, networks, servers, etc. Although time instances may be referred to, these times can correspond to time windows of a non-zero duration.

At time t0, client device 305 can activate one or more application (see for example application 207 corresponding to client device 205 of FIG. 2). Client device 305 can transmit one or more one or more data packets to the network. At time tn, client device 305 can receive one or more packet(s) from the network. For example, the packet 308 sent from the client device 305 at or after t0 can include a request for authentication for the user of client device 305 to access an enterprise critical voice application. The received packet 309 at the client device 305, received at time tn, can be another packet corresponding to a confirmed authentication for the user. As previously discussed, packet(s) can serve other application based functions. Packet(s) can be connective data for operation of the application.

As shown in FIG. 3A, segments s1, s3, s5, s7 can correspond to packet 308 being routed from the client device to external network 307. As shown herein, segments s8, s6, s4, s2 can correspond to packet 309 being routed from the external network 307 to the client device 305. Segments s2 and/or s4 can be at a wireless and/or WLAN transmission segment of the network (e.g. overlay or underlay). Segments s3-s7 as shown in FIG. 3A can be at wired transmission segments of the network (e.g. overlay and/or underlay).

For example, and referring back to FIG. 2, and as will be shown in networking timing and/or routing diagram 300, the network element(s) (i.e. one or more of the network elements shown, such as AP 310, switch 320, and/or gateway 330) can tag the network level QoS field 257 or portion(s) thereof. The network element(s) (i.e. one or more of the network elements shown) can generally look at network level QoS field for routing, switching and/or scheduling decisions. It should be understood that every network element (e.g. those shown in timing and/or routing diagram 300, including AP 310, switch 320, gateway 330) can have prioritized queuing and/or scheduling based on the tagged first and/or second portions of the network level QoS field 257. For example, once the network level QoS field (and/or relevant portion(s) thereof) has been tagged, the network element that completes the tagging, and/or any or all downstream network element(s) (i.e. network elements that receive the packet that has been tagged by that upstream network element) can route, forward, and/or queue the packet 308 and/or packet 309 for transmission according to a value for the network level QoS field 257 (or portion thereof) in that packet, and/or according to the priority 212.

Routing segment s1 can correspond to packet 308 being transmitted to a network element, AP 310, from the client device 305. Segment s1 can be at wireless and/or WEAN transmission segment of the network configuration. Upon receipt of the packet 308, AP 310 can tag network level QoS field 257 according to a priority and/or client device characteristic. Priority can be determined based on priority 212 with reference to FIG. 2, for example as stored in a data store of network element 210 as shown in FIG. 2. For example, AP 310 can tag the first network level QoS portion based on a standard mapping between a wireless QoS and an IP network QoS, e.g. WMM and/or UP mapping as described herein (see at least description of Table 1). The first network level QoS portion can be tagged according to an application-layer message according to the set of mapping rules, and/or according to an application-level protocol. For example, the first network level QoS portion can be tagged as previously explained with respect to Table 1. The AP 310 can tag second network level QoS portion based on enterprise level traffic priority (e.g. based on the client device characteristic such as application class, enterprise criticality, sub-class, application subroutine, user of client device 305, etc.). AP 310 can (also) tag one or more header of the packet based on that enterprise level traffic priority, AP 310 can forward, route and/or queue the packet 308 for transmission.

Segment s3 can correspond to packet 308 sent from the AP 310 to switch 320. As previously discussed with reference to segment s1, the packet 208 can be sent from the AP 310 according to how it was queued for transmission. Segment s5 can correspond to packet 308 sent from switch 320 to gateway 330. Packet analyzer (i.e. part of the switch 320) can determine if the network level QoS field 257 of packet 308 has already been tagged (or not), Because the network level QoS field 257 has already been tagged (see explanation of segment s1, that packet the network level QoS field 257 was tagged at the AP 310), for example, switch 320 can route the packet 308 to gateway 330 directly, Thus, switch 320 can route the packet 308 to gateway 330 upon checking that the network level QoS field (e.g. the first and/or second portion) has been tagged. Segment s7 can correspond to packet 308 sent from the gateway 330 to the network 407. Similarly as described with reference to switch 320 the packet 257 can be directly routed by the gateway 330. This can be an egress segment.

Segment s8 can correspond to packet 309 sent from the network 307 to the gateway 330, Upon receipt of packet 307 (e.g. at an interface 220) gateway 330 can inspect the packet (e.g. by analyzer 217). Gateway 330 can determine that the network level QoS field 257 is tagged (or not). In some embodiments, gateway 330 can route the packet 309 if the network level QoS field 257 is tagged. In some embodiments, gateway 330 can route the packet based on a value of the network level QoS field 257 (or portion thereof). In other embodiments, gateway 330 does not necessarily need to trust that the network level QoS field 257 was properly tagged (i.e. it could have fraudulently been tagged by another device not trusted by the enterprise). To prevent, for example, packets being misrepresented as requiring higher priority levels, gateway 330 (or other network elements) can re-tag the network level QOS field 257. In some embodiments, gateway 330 can tag the network level QoS field 257 as described herein. For example, gateway 330 can tag the second network level QoS portion based on enterprise level traffic priority (e.g. based on priority 212) and/or based on client device characteristic (e.g. based on a user as determined by an IP address in the packet 309, or based on other information in the packet 309, such as information relating to a corresponding application 207). Gateway 330 can tag first and/or second network level QoS portion as described herein. Gateway 330 can queue and/or schedule the packet 309 for transmission according to the requisite priority. For example, gateway 330 can queue and/or schedule the packet 309 for transmission according to values for the network level QoS field, and/or first and/or second network level QoS portion of the packet 309, and/or route the packet 309 accordingly.

Segment s6 can correspond to packet 309 sent from the gateway 330 to the switch 320, e.g. as queued and/or scheduled for transmission as previously discussed.

Segment s4 can correspond to packet 309 sent from the switch 320 to the AP 310. Because the network level QoS field (or portion thereof) has been tagged (for example by another network element of the network configuration, e.g. gateway 33 as previously mentioned with respect to segment s8), the packet 309 can be directly routed by the switch 320. The packet 309 can be routed based on the network level QoS field (or portion thereof), and/or the priority 212.

Segment s2 can correspond to packet 309 sent from the AP 310 to the client device 305. AP 310 can map a first network level QoS portion to application layer WMM according to a standard mapping, e.g. WMM and/or UP mapping as previously discussed. Although this mapping is shown at the AP 310, this mapping can be performed at either of the upstream network elements, e.g. at switch 320, and/or gateway 330 after packet 330 is received the gateway 330. AP 310 can route packet to the client device. The packet can be routed to the client device according to a priority (e.g. enterprise level traffic priority) based on first and/or second network level QoS portion(s).

FIG. 3B shows a non-limiting summary 350 in a table format of such example, non-limiting actions that can be taken at network elements across routing segments of the network routing diagram shown in FIG. 3A. One or more actions can be taken at network elements which are not shown in the summary 350. In some embodiments, one or more actions that are shown in the summary 350 cannot be taken, and such embodiments would still fall under the scope of the present disclosure. As previously described with reference to FIG. 3A, in general, network elements) (i.e. one or more of the network elements shown, such as AP 310, switch 320, and/or gateway 330) can (i) tag the network level QoS field 257 or portion(s) thereof, and/or can use the network level QoS field for routing, switching and/or scheduling decisions. It should be understood that every network element (e.g. those shown or not shown in timing and/or routing diagram 300) can have prioritized queuing, switching, scheduling, and/or transmissions based on the tagged first and/or second portions of the network level QoS field 257. Generally, the actions taken with reference to FIG. 3A and FIG. 3B demonstrate an end-to-end QoS and/or priority enforcement orchestration. These actions can be controlled and/or orchestrated from a remote controller (i.e. physically remote from the network elements). These actions are merely non-limiting examples of embodiments described herein. Column 355 can correspond to the segment as shown in FIG. 3A, and each row in the summary 350 can correspond to the routing segments as described with reference to FIG. 3A. The network element from which the packet (i.e. packet 308 and/or packet 309) is sent is shown in column 360. The network element to which the packet (i.e. packet 308 and/or packet 309) is sent is shown in column 365. The action taken at the related network element (i.e. the from network element shown in column 360 and/or the network element shown in column 365) is shown in column 370.

For example, at segment s1, the AP 310 can mark a network level QoS field (i.e. of packet 308) based on a standard mapping, and/or based on an enterprise level traffic priority. For example, the AP 310 can tag a first network level QoS portion based on the WMM and/or UP mapping (or another standard mapping). The AP 310 can tag a second network level QoS portion based on an enterprise level traffic priority. The AP 310 can then route the packet. As shown herein in summary 350, generally, "route packet" can correspond to routing the packet according to a priority based on a value for the network level QoS field, and/or first and/or second network level QOS portion. Thus, the network elements as described herein can map a value for the network level QoS field (or value(s) for portion(s) thereof) to a particular que for transmission (i.e. to be queued according to a particular priority). Generally, where "route packet" is shown in the summary 350, it can generally be understood that the packet can be routed according to priority (e.g. an enterprise level traffic priority) for a transmission que. The packet can be routed according to one or more QoS dimensions (or QoS service dimensions). For example, the packet can be routed according to a priority mapping between one or more values for the network level QoS field (and/or values for portion(s) thereof). For example, the priority mapping can be as shown with reference to priority 213 of the network element 210 shown in FIG. 2.

At segment s2, the AP 310 can map the first network level QoS portion (i.e., of packet 309) to application layer WMM according to WMM and/or UP mapping (or another standard mapping for the wireless segment), The AP 310 can map second network level QoS portion to a particular queue for transmission. The AP 310 can then route the traffic.

At segment s3, the switch 320 can route the packet (i.e. packet 308). At segment s4, the switch 320 can route the packet (i.e. packet 309). At segment s5, the gateway 330 can route the packet (i.e. packet 308). At segment s6, the gateway 330 can route the packet (i.e. packet 309). At segment s7, the gateway 330 can route the packet (i.e. packet 308), for example to the external network 307.

At segment s8, the gateway 330 can tag the network level QoS field (i.e. of packet 209) according to the enterprise level traffic priority, and/or to the WMM and/or UP mapping (or another standard mapping). The gateway 330 can tag the second network level QoS portion (i.e. of the network level QoS field) according to an enterprise level traffic priority. The gateway 330 can tag the first network level QoS portion according to a standard mapping, such as the WMM and/or UP mapping (or another standard mapping). The gateway 330 can queue the packet for transmission and/or get ready for routing as shown in segment s6.

Overlay Header Solution

As previously mentioned, one or more network elements can inspect, read, write, and/or tag a header of an IP packet for enhanced QoS. In SD-WAN implementations, a SDN overlay network can be managed by a SD-WAN controller for IP traffic. A SD-WAN controller can also be embodied as an orchestrator. Routing calculations and routing policies can be managed by one or more central SD-WAN controller for overlay network end points and/or nodes. The one or more central SD-WAN controller can be embodied as controller 140, and/or controller 211 as shown in FIG. 1 and FIG. 2, respectively. In some embodiments, routing priority for traffic between the overlay endpoints in an SDN overlay network can be configured by the SD-WAN controller to accommodate a service level agreement, customer policies, and/or priorities. As previously discussed, a priority can be assigned based on at least one of an application operating on the client device and/or a user of the client device. This information can be included in the overlay header. For example, in an overlay network, either through GRE or VxLAN, a tag could be put into the overlay header (e.g. GRE or VxLAN header) to indicate a priority. This orchestration approach can be used in combination with other orchestration approaches described herein (such as other tagging and/or routing steps as described herein).

Figure 4:
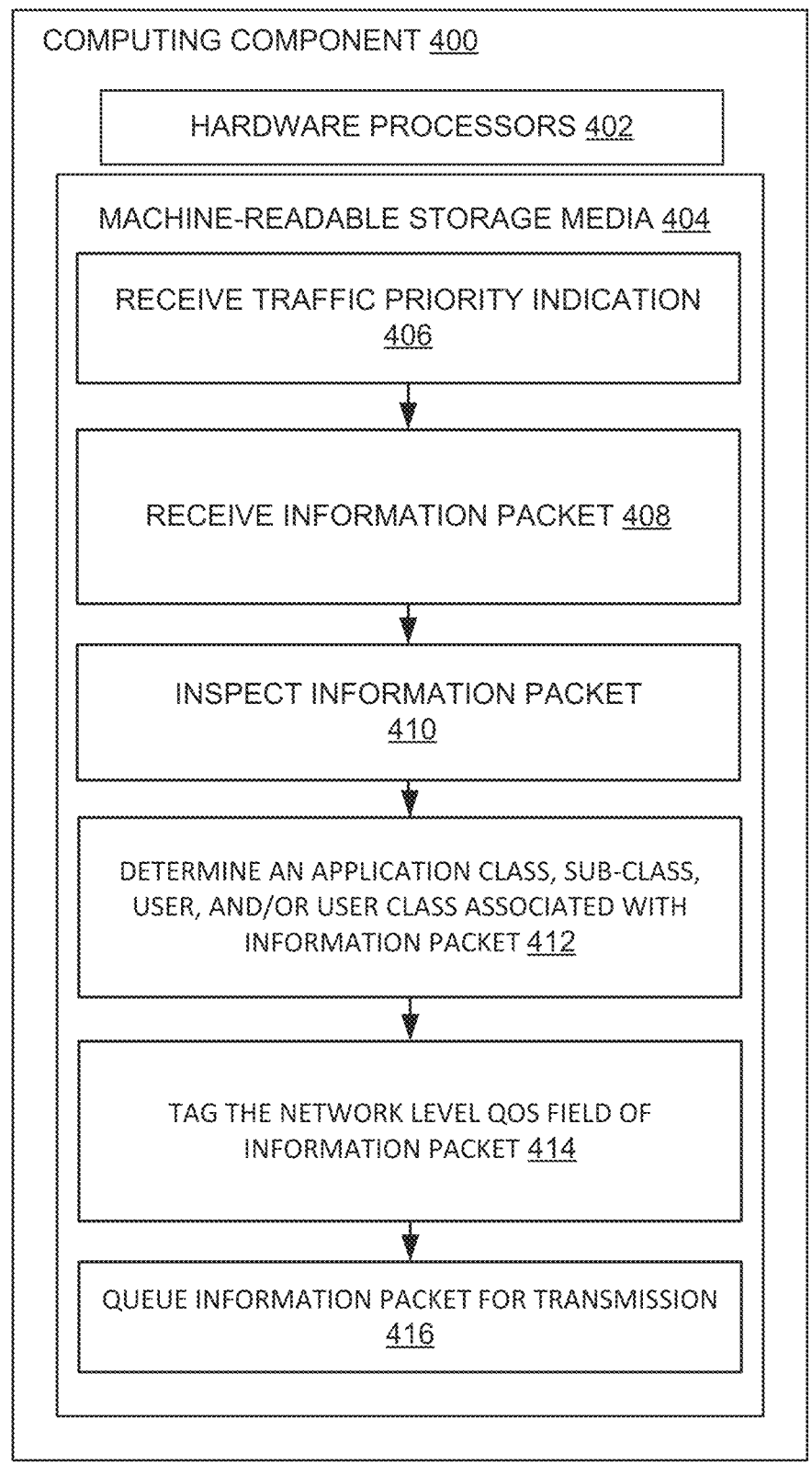
FIG. 4 shows a block diagram of an example computing component or device for implementing enhanced QoS according to some embodiments of the present disclosure.

FIG. 4 shows a block diagram of an example computing component or device for implementing enhanced QoS at one or more network elements and/or across one or more network segments according to some embodiments of the present disclosure. Computing component 300 may be, for example, a server computer, a controller (e.g. administrative controller 140 as shown in FIG. 1), or any other similar computing component capable of processing data. The computing component 400 can include a hardware processor 402, and machine-readable storage medium 404. The computing component, can be, for example, part of one or more network elements (e.g. network element 210), and/or controller 211 external to network element 210.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-414, to control processes or operations for enabling enhanced QoS across the network. Instructions 406-414 can correspond to steps for performing one or more methods according to aspects of the present disclosure. As an alternative or in addition to retrieving and executing instructions, hardware processor 402 may include one or more electronic circuits that include electronic components for performing the functionality of one or more instructions, such as a field programable gate array (FPGA), application specific integrated circuit (ASIC), or other electronic circuits.

Hardware processor 402 can execute instruction 406 for receiving at a network element (e.g. at AP, gateway, router, and/or switch), or at a controller of the network element (e.g. controller 140 described with reference to FIG. 1) a traffic priority indication. Traffic priority indication can be corresponding to a requested enterprise wide traffic priority (see also priority 212 as shown in FIG. 2). Traffic priority indication can correspond to QoS priority as described herein, for example, according to an SLA. The traffic priority can at least based on a client device characteristic, such as a device type, an application class, sub-class, and/or a user class. Each traffic priority level can correspond to a network level QoS value. The network level QoS value can have a first network level QoS value and a second network QoS value.

As described herein, the network elements can be configured to receive data from one or more devices and/or other network elements (for example, receipt of packet 250 with reference to FIG. 2 at least by interface 220, and/or scheduler 215). The data can be impinged on one or more signal, for example and RF and/or digital signal, Machine-readable storage medium 404 can include instruction 408 for receiving at the network element (e.g. at an interface thereof), signal having an information packet embedded thereon. The information packet can include a network level QoS field. The network level QoS field can have a first network level QoS portion, a second network level QoS portion, a third network QoS portion, etc. For example, the first network level QoS portion can be first portion of a differentiated services code point (DSCP) field and the second network level QoS portion can be a second portion of a DSCP field and together, they can be marked with a DSCP value. One or more instructions as described herein can refer to a portion of the network level QoS field, however, it is understood one instruction for an action on or with that portion, can be applied to another portion and/or to the whole of the network level QoS field.

Hardware processor 402 can execute instruction 410 for inspecting the information packet, e.g. by packet analyzer 217 as shown with reference to FIG. 2. The information packet can be inspected by a data processing technique, such as packet sniffing, deep-packet-inspection, filtering, identifying, reading, etc. In embodiments, inspecting the information packet can include determining if the network level QoS field is tagged (or not), such as the first network level QoS portion and/or the second network level QoS portion.

Hardware processor 402 can execute instruction 412 for determining a client device characteristic, such as a device type, an application class, sub-class, and/or user class associated with the information packet. In one or more embodiments, instruction 410 can be executed only if the second network level QoS portion is not tagged. Hardware processor 402 can determine if the second network level QoS portion is tagged at least by executing instruction 10 as previously described. The second network level QoS portion can correspond to the client device characteristic (e.g. client device type, application class, sub-class, user, and/or user class). In systems, the system can make the determination regardless of if the second network level QoS portion is tagged. For example, if the network element is an AP and/or a gateway network element, and the information packet is received as an ingress to the network, the system would want to make sure the second network level QoS portion is tagged correctly, or has not been spoofed (e.g. to request a higher level of service regardless of the user and/or application.)

The client device characteristic, e.g. device type, application class, sub-class, and/or user class can be determined by examining one or more traffic data, IP packet, etc. For example, a flag may indicate an application type. For example, the type of application and/or the application name may be included in an overlay header. As another example, the user may be determined from examining a source and/or destination IP address. The client device characteristic, e.g. device type, application class, sub-class, and/or user class, can be provided by the controller.

Hardware processor 402 can execute instruction 414 for tagging the network level QoS field of the information packet. In systems, the network level QoS field can be tagged only if not already tagged (e.g. as determined when inspected). In systems, the system can tag the network level QoS field regardless of if the network level QoS portion has been tagged. For example, if the network element is an AP and/or a gateway network element, and the information packet is received at an ingress to the network, the system would want to make sure the QoS portion is tagged correctly, or at least has not been spoofed (e.g. to request a higher level of service/priority regardless of the user and/or application.)

As previously explained, the network level QoS field of the information packet can have more than one portion. An instruction can include tagging the first network level QoS portion of the information packet, tagging the second network level QoS portion of the information packet, etc. The network level QoS field can be tagged according to network level QoS value. In systems, tagging the first network level QoS portion can correspond to queuing the information packet for transmission according to a first QoS service dimension. In systems, first network level information packet can be tagged according to a first network level QoS value only if the first network level QoS portion is not already tagged. In systems, tagging the second network level QoS portion allows for queuing the information packet for transmission from the network element according to a second QoS dimension other than the first QoS dimension. Second network level QoS portion of the information packet can be tagged according to the traffic priority indication and/or according to the determined client device characteristic, e.g. the application sub-class or user class. In systems, second network level QoS portion can be tagged only if the second network level QoS portion is not tagged.

The system can further mark an IP header of the information packet with the network level QoS value, or any other value corresponding to the network level QoS value and/or corresponding to the network level priority.

Hardware processor 402 can execute instruction 416 for queuing the information packet for transmission from the network element based on the tagged network level QoS field, e.g. based on the tagged first network level QoS portion and/or the second network level QoS portion. In systems, tagging the first network level QoS portion can correspond to queueing the information packet for transmission according to a QoS dimension having a first priority. Tagging the second network level QoS portion with a specific value can allow for queuing the information packet from for transmission from the network element according to an enhanced priority of the same QoS dimension, or according to a second QoS priority dimension. In systems, tagging the second network level QoS portion can allow for overriding the queue for transmission according to the QoS dimension having the first priority. The network level QoS field and/or respective portions may have been tagged at the network element where the information packet is being queued for transmission from, or at an upstream network element from which the information packet was received.

Hardware processor(s) 402 can execute instructions for snapping the first network level QoS value to an application-layer message according to the set of mapping rules and tag the application-layer message according to an application-level protocol. In systems, the first network level QoS value can be mapped to the application-layer message in the information packet when the information packet is determined to be sent to a downstream wireless network connected client device. For example, by inspecting the destination IP address.

Figure 5:
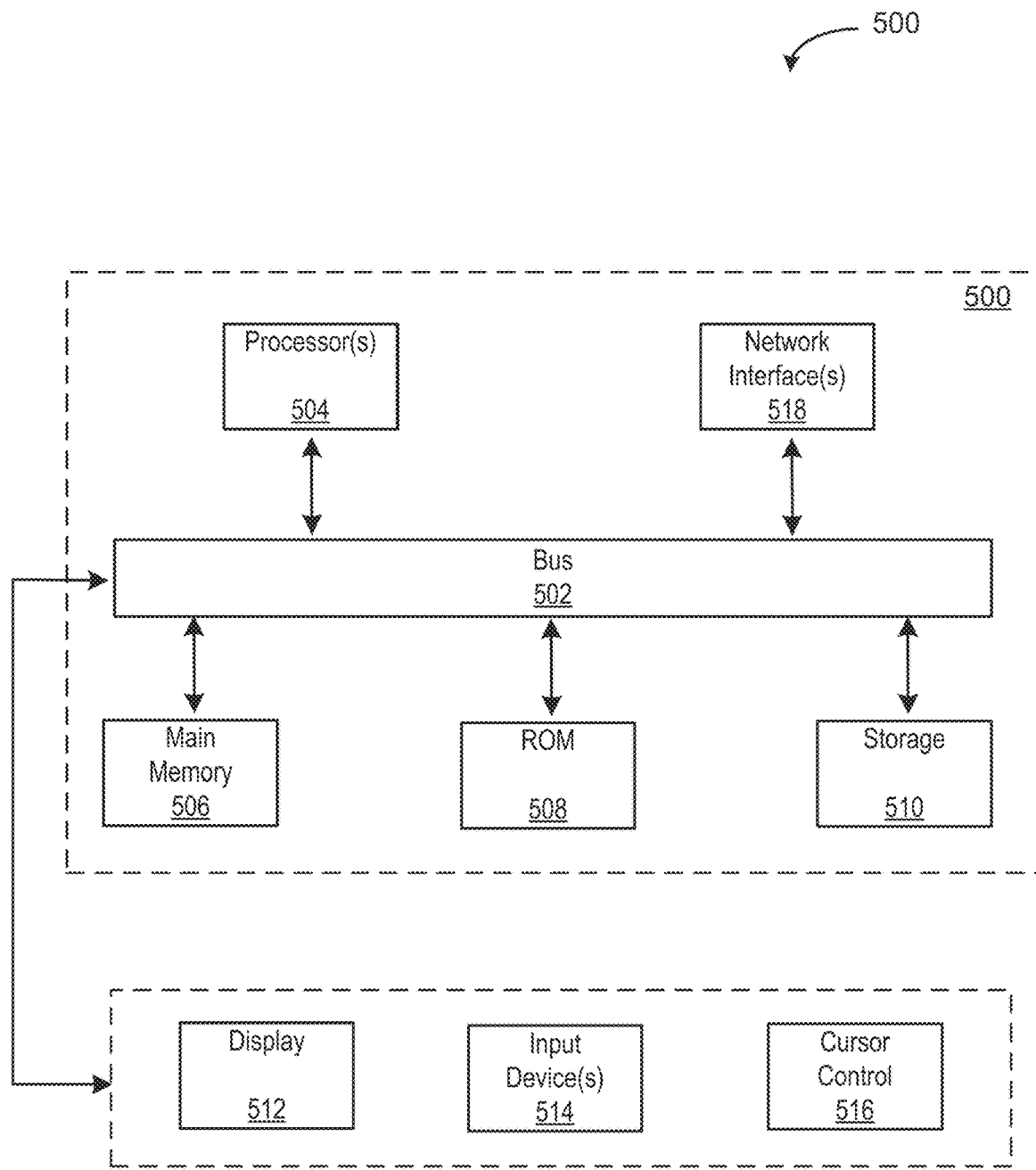
FIG. 5 shows an example computing component that may be used to implement various features of embodiments described in the present disclosure.

FIG. 5 depicts a block diagram of an example computer system 500 in which various of the embodiments described herein may be implemented, for example controller 140 as shown in FIG. 1, controller 211 as shown in FIG. 2, and/or computing component 400 as shown in FIG. 4). The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes memory units, such as a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. Also coupled to bus 502 are a display 512 for displaying various information, data, media, etc., input device 514 for allowing a user of computer system 500 to control, manipulate, and/or interact with computer system 500. One manner of interaction may be through a cursor control 516, such as a computer mouse or similar control/navigation mechanism.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language. It will be appreciated that software components may be callable from other components or from themselves, and/or may be invoked in response to detected events or interrupts. Software components configured for execution on computing devices may be provided on a computer readable medium, or any other tangible medium, or as a digital download. Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes the wires that comprise bus 502. Transmission media can also take the form of acoustic or light waves, such as those generated during radio-wave data communications. The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features elements and/or steps.

Terms and phrases used in this document, and variations thereof, unless otherwise expressly stated, should be construed as open ended as opposed to limiting. The presence of broadening words and phrases such as "one or more," "at least," "but not limited to" or other like phrases in some instances shall not be read to mean that the narrower case is intended or required in instances where such broadening phrases may be absent.

What is claimed is:

1. A method performed by a hardware processor, comprising:
    inspecting an information packet, the information packet comprising a network level Quality of Service (QoS) field having a first network level QoS portion and a second network level QoS portion;
    if the second network level QoS portion is not tagged, determining an application sub-class or user class associated with the information packet;
    if not already tagged, tagging the first network level QoS portion of the information packet according to a first network level QoS value, and if the information packet is determined to be sent to a downstream wireless network connected client device, mapping the first network level QoS value to an application-layer message according to a set of mapping rules and tagging the application-layer message according to the mapping;
    if not already tagged, tagging the second network level QoS portion of the information packet according to a traffic priority and to the determined application sub-class or user class; and
    queuing the information packet for transmission from a network element based on the network level QOS field, wherein the hardware processor is part of an access point.

2. The method of claim 1, wherein the information packet is queued for transmission based on at least one of a required transmission bitrate, latency, jitter probability, traffic loss probability, throughput, reliability, drop probability, or any other user-defined policy.

3. The method of claim 1, wherein the first network level QoS portion is a first portion of a differentiated services code point (DSCP) field and the second network level QoS portion is a second portion of a DSCP field and together are marked with a DSCP value.

4. The method of claim 3, wherein the machine-readable storage medium further comprises instructions which when executed by the hardware processor, cause the hardware processor to mark an IP header of the information packet with the DSCP value.

5. The method of claim 1, wherein the network element is a network access point, gateway, or switch.

6. The method claim 1, wherein:
    tagging the first network level QoS portion corresponds to queuing the information packet for transmission according to a first QoS service dimension; and
    tagging the second network level QoS portion allows for queuing the information packet for transmission from the network element according to a second QoS dimension other than the first QoS dimension.

7. The method of claim 1, wherein:
    tagging the first network level QoS portion corresponds to queuing the information packet for transmission according to a QoS dimension having a first priority; and
    tagging the second network level QoS portion with a specific value allows for overriding the queue for transmission according to the QoS dimension having the first priority, and queuing the information packet for transmission from the network element according to an enhanced priority of the QoS dimension.

8. The method of claim 1, further comprising:
    extracting an application-layer message from the information packet; and mapping the application-layer message to the first network level QoS value according to a set of mapping rules, such that the first network level QoS portion of the information packet is tagged according to the mapping.

9. The method of claim 1, wherein when the application sub-class corresponds to an enterprise critical application of a first class, the upstream information packet is queued for transmission with an enhanced priority compared to the priority if the application sub-class corresponds to an enterprise non-critical application of the first class.

10. The method of claim 1, wherein the hardware processor is configured as a component of a software-defined wide area network (SD-WAN) orchestrator operable to control an overlay and underlay of the SD-WAN, and wherein the network element comprises a network access point, a gateway, or switch of the underlay.

* * * * *